No. 642,750. Patented Feb. 6, 1900.
L. B. NIELSEN.
COMBINATION MEASURING TOOL.
(Application filed Nov. 29, 1898.)
(No Model.) 2 Sheets—Sheet 1.
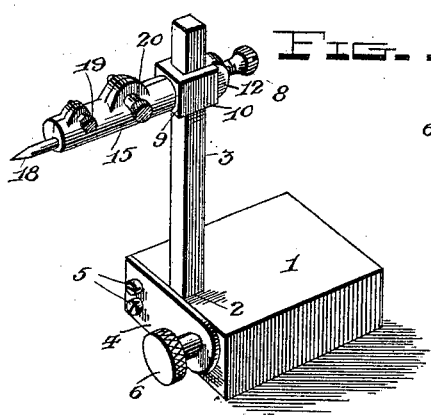
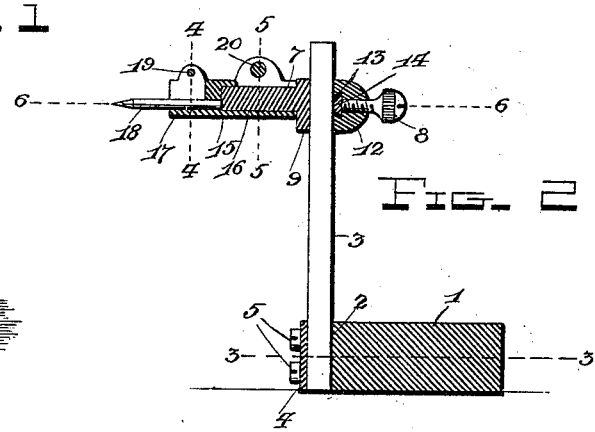
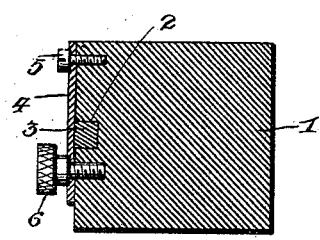
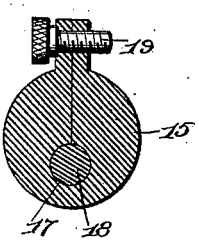
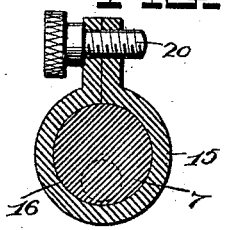
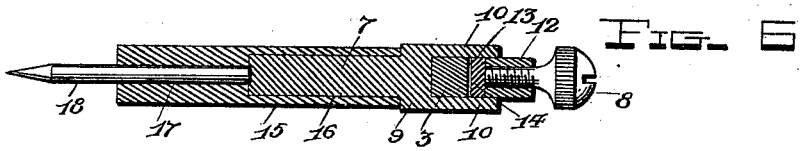
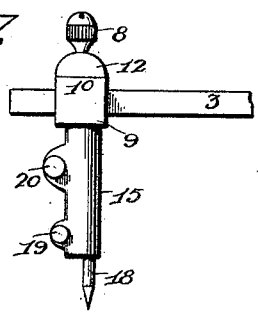
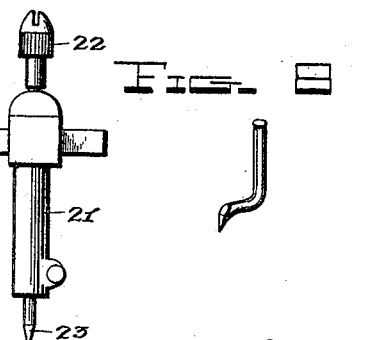
Witnesses
Thomas Lloyd Jenkins
L. Parker Farrington
Inventor
L. B. Nielsen,
by
Irving Ulring
Attorney.

No. 642,750. Patented Feb. 6, 1900.
L. B. NIELSEN.
COMBINATION MEASURING TOOL.
(Application filed Nov. 29, 1898.)
(No Model.) 2 Sheets—Sheet 2.
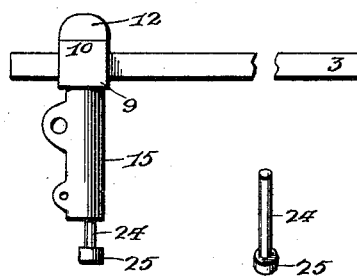
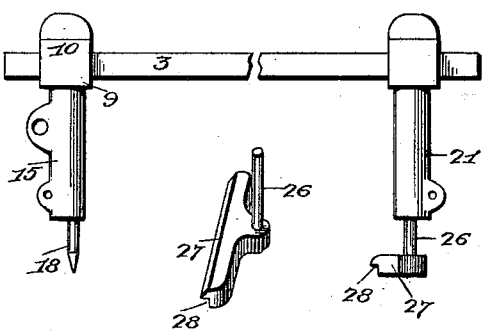
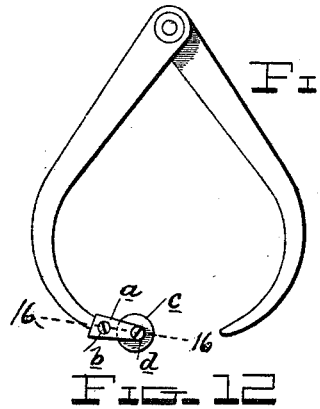
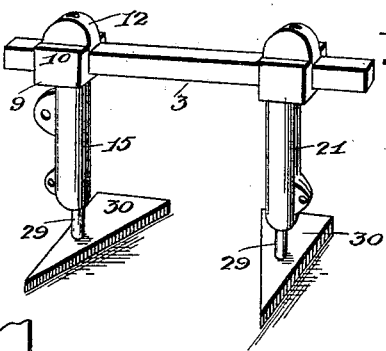
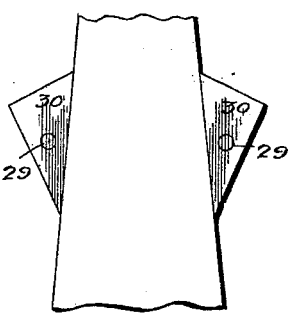
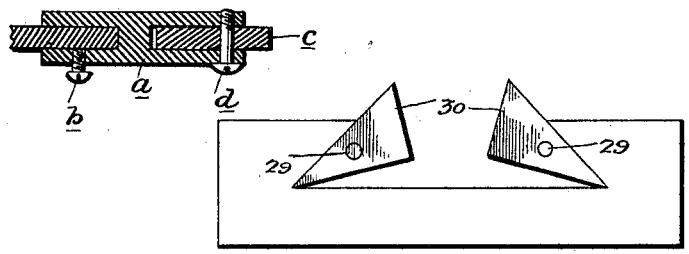

UNITED STATES PATENT OFFICE.

LAURITZ B. NIELSEN, OF POUGHKEEPSIE, NEW YORK.

COMBINATION MEASURING-TOOL.

SPECIFICATION forming part of Letters Patent No. 642,750, dated February 6, 1900.

Application filed November 29, 1898. Serial No. 697,739. (No model.)

*To all whom it may concern:*

Be it known that I, LAURITZ B. NIELSEN, a citizen of the United States, residing at Poughkeepsie, in the county of Dutchess and State of New York, have invented new and useful Improvements in Combination Measuring-Tools, of which the following is a specification.

My invention relates to combination measuring-tools for machinists; and the object is to provide a device of such general utility as will meet the various wants of this class of mechanics in accurately gaging their work.

To this end the invention consists in the construction, combination, and arrangement of the several parts of the device, as will be hereinafter more fully described, and particularly pointed out in the appended claims.

In the accompanying drawings the same reference characters indicate the same parts of the device.

In the drawings, Figure 1 is a perspective view of my improved measuring-tool assembled as a surface-gage. Fig. 2 is a vertical section of the same. Fig. 3 is a horizontal section on the broken line 3 3 of Fig. 2. Fig. 4 is an enlarged transverse section on the dotted line 4 4 of Fig. 2. Fig. 5 is a similar view on the dotted line 5 5 of Fig. 2. Fig. 6 is an enlarged horizontal section on the dotted line 6 6 of Fig. 2. Fig. 7 is a side elevation showing the manner of adjusting the tool as dividers or beam-compasses. Fig. 8 is a perspective view of a modified form of divider-point. Fig. 9 is a side elevation of the device adjusted as a pair of inside or outside calipers, and the small figure between the legs is a perspective view of one of the caliper-points. Fig. 10 is a similar view of the tool adjusted as a scratch-gage, and the small figure between the legs is a perspective view of the gage-leg. Fig. 11 is an outline perspective view of the device adjusted as an angle-gage; and Figs. 12, 13, and 14 are diagrammatic views showing a few of the many applications of the angle-gage. Fig. 15 is a modification of the sleeve, showing the eccentric principle for fine adjustment applied to one leg of a pair of calipers. Fig. 16 is a horizontal section on the line 16 16 of Fig. 15.

1 denotes the rectangular base-block formed on one of its sides with a transverse rectangular groove 2, arranged at a true right angle to the plane of the base-block, and the width of this groove is slightly in excess of its depth, so that the bar 3, which is a true square in cross-section, when seated in the groove will slightly project beyond the alined faces of the side of the base-block on each side of said groove.

4 denotes a leaf-spring fixed at one end by the screws 5 5 to the slotted side of the base-block, and its free end extends across the bar 3 and groove 2 and is adjustably secured to the contiguous side of said base-block by a milled-head thumb-screw 6, thus clamping the lower end of said bar in place without injuring its clamping-face, a very important point in the use and accurate adjustment of a tool of this character.

7 denotes the movable leg, adjustably secured on the bar 3 by the thumb-screw 8, fitted in the head 9. This head is of novel construction, being formed with parallel jaws 10 10 integral with the leg 7, and between the outer ends of said jaws is secured a block 12, through which the adjusting-screw passes. The inner face of the block 12 is formed with a transverse dovetail groove 13 to receive a correspondingly-formed cotter 14, slightly smaller than said groove and interposed between the inner end of the adjusting-screw and the contiguous face of the bar 3, this construction preventing the screw from marring the bar, and the shape of the cotter and dovetail groove prevents the accidental loss or displacement of the cotter from the head.

The shank of the leg 7 is cylindrical to receive the inner end of the adjustable sleeve 15, the longitudinal orifice 16, which receives said cylindrical shank, being axially alined with said sleeve. The outer end of said sleeve is also formed with a somewhat smaller longitudinal cylindrical orifice 17, formed eccentric to the axis of the sleeve and of course eccentric to the orifice 16.

18 denotes a center-point removably secured in the outer end of the sleeve by a thumb-screw 19, and 20 denotes a corresponding thumb-screw at the inner end of the sleeve, the sleeve itself being split at each end and the meeting edges of the split walls being formed with parallel ears, as shown, to receive their respective thumb-screws. This construction permits the inner end of the sleeve being adjustably or removably secured on the leg, or the center-point being similarly connected to the sleeve without injuring their contiguous parts, as would be the case if the adjusting-screws came in contact with the leg or the center-point. A very important feature of this part of the tool is the convenience and accuracy with which the center-point can be adjusted to exact measurements, which is very effectively accomplished by approximately adjusting the point 18 to a given line by means of the thumb-screw 8, and then by rotating the sleeve, (the center-point being eccentric to the axis of rotation of said sleeve.) The point is thus brought to the true line with the same facility and accuracy as can be done with the expensive micrometer adjustment.

When the tool is to be used for other purposes than that of a surface-gage, as hereinafter described, the base-block 1 is removed from the bar 3 and in its place is secured an auxiliary leg 21, mounted on said bar parallel with the first-mentioned leg 7 and provided with a retaining-screw 22 and a removable center-point 23, the tool thus assembled, as shown in Fig. 7, forming a complete and perfect pair of dividers or beam-compasses, and of course it is intended to use several bars similar to the bar 3, but of different lengths, to more conveniently adapt the tool to a wide range of work.

In Fig. 8 I have shown a curved form of center-point, which when adjusted to the leg 21 permits the two points to be brought very close together to measure minute distances, or when adjusted in the sleeve on the opposite leg allows a much wider range of adjustment between the points without changing the adjustment of either leg.

In Fig. 9 both of the center points are replaced by the pins 24, the outer ends of which terminate in the disk-shaped heads 25, the inner walls of which form outside calipers and the outside walls of which form inside calipers, one of these caliper-points being shown in a detached view between the parallel legs of the tool shown in Fig. 9.

In Fig. 10 the gage-leg 26 (shown in perspective in the small detached view of the same figure) is inserted in lieu of one of the points, and its head 27 is formed with a rabbeted guide-recess 28, which has a sliding engagement with the edge of the work, while the point on the other leg sets off the measurement on the face of the work.

In Fig. 11 I have shown both points replaced by the stems 29, the outer ends of which terminate in heads 30, the plane face of which conforms to a right-angle triangle, the perpendiculars of which, when in parallel adjustment, as shown in Fig. 12, serve to gage the parallelism of the sides of a piece of work and the alined bases will indicate a cross-line, which will be at right angles to the parallel sides.

In the next view, Fig. 13, the hypotenuses of the heads 30 are used to measure the degree of convergence of the sides of a piece of work—such, for example, as a taper key, a drift-pin, or the like.

In Fig. 14 the heads are adjusted to ascertain the degree of angularity of the walls of a dovetail guide-groove—such, for example, as is cut in a slide-rest—in order that the corresponding portion of the carriage may fit up to conform thereto.

In Figs. 15 and 16 I have shown the eccentric principle applied to one leg of a common pair of machinist's calipers, and in which $a$ denotes a socket, the rear end of which is formed with a pocket to receive the end of one of the caliper-legs, which is removably secured in place by the lateral set-screw $b$. The outer end of the socket $a$ is bifurcated to receive the eccentric disk $c$, which is eccentrically journaled on the transverse set-screw $d$, adjustably secured in the parallel arms of the bifurcated end of the socket in such a manner that when the set-screw $d$ is loose the disk may be rotated on its concentric axis and its periphery which is opposed to the opposite leg of the calipers may be brought closer to or removed from the meeting-point of said opposite leg to attain the fine adjustment hereinbefore described, and this is accomplished, as in the first instance, without changing the coarse adjustment of the legs. When the proper adjustment has been made, the set-screw $d$ is tightened up, and the disk $c$ is thus rigidly secured by being clamped between the parallel arms of the socket.

It will of course be understood that the peculiar micrometer adjustment of the sleeve 15 applies in all the various adjustments of the tool, and the principle of the eccentric adjustability of one of the points may be applied to the ordinary hinged-leg dividers or calipers with the same advantage and result as that set forth for the compasses or gages above described.

In practice the four sides of the bar will be graduated, one of them to the decimal system and the others to the arbitrary scales in general use, thus facilitating the coarse adjustment, while the finer or true adjustment is determined by the eccentric feature of the sleeve 15.

Having thus fully described the invention, what I claim, and desire to secure by Letters Patent, is—

1. In a measuring-tool of the class described, a pair of indicator-points one of which has an eccentric adjustment about its approximately-fixed center, as and for the purpose set forth.

2. In a measuring-tool of the class described, a body portion such as the bar 3, a pair of legs such as 7 and 21 adjustably secured on said bar, the leg 7 being formed with a cylindrical shank, the adjustable sleeve encompassing said shank, and having its outer end formed with a longitudinal cylindrical orifice, arranged eccentric to the axis of said shank, and a center-point removably secured in said orifice, as and for the purpose set forth.

In testimony whereof I have hereunto set my hand in the presence of two subscribing witnesses.

LAURITZ B. NIELSEN.

Witnesses:
MARTIN HEERMANCE,
IRVING ELTING.